United States Patent
Chung et al.

(10) Patent No.: US 6,745,348 B2
(45) Date of Patent: Jun. 1, 2004

(54) METHOD FOR ESTIMATING NUMBER OF INTERNATIONALIZATION FAULTS IN SOFTWARE CODE

(75) Inventors: Dae-Suk Chung, Austin, TX (US); Gregory P. Davis, Raleigh, NC (US); David B. Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 09/881,937

(22) Filed: Jun. 14, 2001

(65) Prior Publication Data

US 2003/0005364 A1 Jan. 2, 2003

(51) Int. Cl.$^7$ ............................................. G06F 11/00
(52) U.S. Cl. ................................. 714/47; 717/124
(58) Field of Search ................... 714/38, 47; 702/179, 702/181; 717/124, 130

(56) References Cited

U.S. PATENT DOCUMENTS

| | | | |
|---|---|---|---|
| 5,168,563 A | | 12/1992 | Shenoy et al. ............... 395/500 |
| 5,450,586 A | | 9/1995 | Kuzara et al. ............... 395/700 |
| 5,548,718 A | | 8/1996 | Siegel et al. ............. 395/183.14 |
| 5,586,252 A | | 12/1996 | Barnard et al. ......... 395/185.01 |
| 5,655,074 A | | 8/1997 | Rauscher ............... 395/183.14 |
| 5,867,710 A | * | 2/1999 | Dorris et al. ............... 717/124 |
| 5,950,147 A | * | 9/1999 | Sarangapani et al. ....... 702/179 |
| 6,038,517 A | | 3/2000 | Dobbins et al. .............. 702/82 |
| 6,067,639 A | * | 5/2000 | Rodrigues et al. ............ 714/38 |
| 6,088,801 A | | 7/2000 | Grecsek ...................... 713/200 |
| 6,173,240 B1 | * | 1/2001 | Sepulveda et al. ............. 703/2 |
| 6,226,760 B1 | * | 5/2001 | Burkhardt et al. ............ 714/33 |
| 6,374,369 B1 | * | 4/2002 | O'Donnell .................... 714/38 |
| 6,467,079 B1 | * | 10/2002 | Ettritch et al. .............. 717/108 |
| 6,594,783 B1 | * | 7/2003 | Dollin et al. ................. 714/38 |
| 2002/0095660 A1 | * | 7/2002 | O'Brien et al. ............. 717/127 |
| 2003/0005364 A1 | * | 1/2003 | Chung et al. ................ 714/38 |
| 2003/0088810 A1 | * | 5/2003 | Marshall ..................... 714/38 |

OTHER PUBLICATIONS

Bays, Micahel "Software Release Methodology" Jun. 23, 1999, pp68–74.*
Kan, Stephen "Metrics and Models in Software Quality Engineering" Dec. 19, 1994 pp109–124.*

* cited by examiner

Primary Examiner—Robert Beausoliel
Assistant Examiner—Bryce P. Bonzo
(74) Attorney, Agent, or Firm—Robert A. Voigt, Jr.; Winstead Sechrest & Minick P.C.; Jeffrey S. LaBaw (57) ABSTRACT

A method, computer program product and system for estimating the number of internationalization faults, e.g., errors, warnings, in a software program. The number of internationalization faults may be estimated by scanning a subset of the total lines of code in a software program. A first factor may be calculated based on a count and the number of faults identified in the lines of code scanned. A second factor may be calculated based on the number of faults remaining after subtracting the number of faults identified in error from the number of faults identified in the lines of code scanned as well as the number of faults identified in the lines of code scanned. An estimate of the number of faults in the entire software program may be calculated based on the first and second factor and the count of the total number of lines of code in the software program.

30 Claims, 3 Drawing Sheets

METHOD FOR ESTIMATING NUMBER OF INTERNATIONALIZATION FAULTS IN SOFTWARE CODE

TECHNICAL FIELD

The present invention relates to the field of software program development for internationalized programs, and more particularly to a method for estimating the number of internationalization faults in an internationalized software program.

BACKGROUND INFORMATION

Internationalization is a process of enabling a program, e.g., Java, to run internationally. That is, an internationalized program has the flexibility to run correctly in any country. An internationalized program must be able to read, write and manipulate localized text. Furthermore, an internationalized program must conform to local customs when displaying dates and times, formatting numbers and sorting strings.

Typically, the development of an internationalized software program involves the initial steps of analyzing a problem and then designing the overall structure of the internationalized software program to solve the problem analyzed. After the general structure of the internationalized software program has been designed, it is then constructed, i.e. coded, after which it undergoes a period of testing and debugging. Finally, after the internalized program has been successfully tested, it is released for general use.

The total time spent testing and debugging an internationalized software program may vary from program to program. Unfortunately, software developers when asked to test and debug a particular internationalized software program may not be able to estimate the number of internationalization faults, e.g., errors, warnings, in the particular internationalized software program to be debugged thereby being unable to estimate the number of hours to be spent testing and debugging the internationalized software program. Furthermore, a project manager may assign multiple software developers to test and debug a particular internationalized software program. Unfortunately, the project manager may not be able to determine the exact number of software developers to be assigned since the project manager may not be able to estimate the number of internationalization faults, e.g., errors, warnings, in the particular internationalized software program to be debugged thereby being unable to estimate the number of software developers to be assigned to test and debug the particular internationalized software program.

It would therefore be desirable to develop a method to estimate the number of internationalization faults, e.g., errors, warnings, in a particular internationalized software program.

SUMMARY

The problems outlined above may at least in part be solved in some embodiments by calculating an estimated number of internationalization faults, e.g., errors, warnings, in the software program based on a first and a second factor as well as a count of the total number of lines of code in the software program. The estimated number of internationalization faults, e.g., errors, warnings, in the software program may be based on scanning a subset of the total number of lines of code in the software program rather than scanning the total number of lines of code in the software program.

Upon scanning a subset of the total number of lines of code in the software program, a number of internationalization faults, e.g., errors, warnings, as well as a count of the number of lines of code scanned may be identified. The first factor may be calculated based on the number of internationalization faults, e.g., errors, warnings, identified in the code scanned as well as the count of the lines of code scanned. Upon identifying the internationalization faults, e.g., errors, warnings, in the lines of code scanned, a manual analysis may be performed to identify internationalization faults, e.g., errors, warnings, that should not have been identified. These incorrectly identified internationalization faults may then be subtracted from the internationalization faults, e.g., errors, warnings, identified in the code scanned. The number of internationalization faults, e.g., errors, warnings, remaining after subtracting the incorrectly identified internationalization faults from the internationalization faults identified in the code scanned along with the number of internationalization faults identified from the code scanned may be used to calculate the second factor. An estimate of the number of internationalization faults, e.g., errors, warnings, in the entire code of the software program may then be calculated based on the first and second factor as well as the count of the total number of lines of code in the software program.

In one embodiment, a method for estimating the number of internationalization faults in a software program comprises the step of scanning a subset of the total number of lines of code in a software program. A number of internationalization faults, e.g., errors, warnings, may then be identified in the lines of code scanned. A first factor may then be calculated based on a count of the lines of code scanned and the number of internationalization faults, e.g., errors, warnings, identified in the lines of code scanned. Upon scanning a subset of the total number of lines of code in the software program, an analysis may be conducted to identify internationalization faults, e.g., errors, warnings, that should not have been identified. The internationalization faults, e.g., errors, warnings, identified in error may be subtracted from the internationalization faults identified, e.g., errors, warnings, in the lines of code scanned. A second factor may then be calculated based on the number of internationalization faults, e.g., errors, warnings, remaining after subtracting the number of internationalization faults identified in error from the number of internationalization faults identified in the lines of code scanned as well as the number of internationalization faults identified in the lines of code scanned. An estimate of the number of internationalization faults, e.g., errors, warnings, in the entire software program, i.e. in all the lines of code of the software program, may then be calculated based on the first and second factor as well as the count of the total number of lines of code in the software program.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and data processing system for estimating the number of internationalization faults, e.g., errors, warnings, in an internationalized software program. In one embodiment of the present invention, a method comprises the step of scanning a subset of the total number of lines of code in a software program. A number of internationalization faults, e.g., errors, warnings, may then be identified in the lines of code scanned. A first factor may then be calculated based on a count of the lines of code scanned and the number of internationalization faults, e.g., errors, warnings, identified in the lines of code scanned. Upon scanning a subset of the total number of lines of code in the software program, an analysis may be conducted to identify internationalization faults, e.g., errors, warnings, that should not have been identified. The internationalization faults, e.g., errors, warnings, identified in error may then be subtracted from the internationalization faults identified, e.g., errors, warnings, in the lines of code scanned. A second factor may then be calculated based on the number of internationalization faults, e.g., errors, warnings, remaining after subtracting the number of internationalization faults identified in error from the number of internationalization faults identified in the lines of code scanned as well as the number of internationalization faults identified in the lines of code scanned. An estimate of the number of internationalization faults, e.g., errors, warnings, in the entire software program, i.e. in all the lines of code of the software program, may then be calculated based on the first and second factor as well as the count of the total number of lines of code in the software program.

Figure 1:
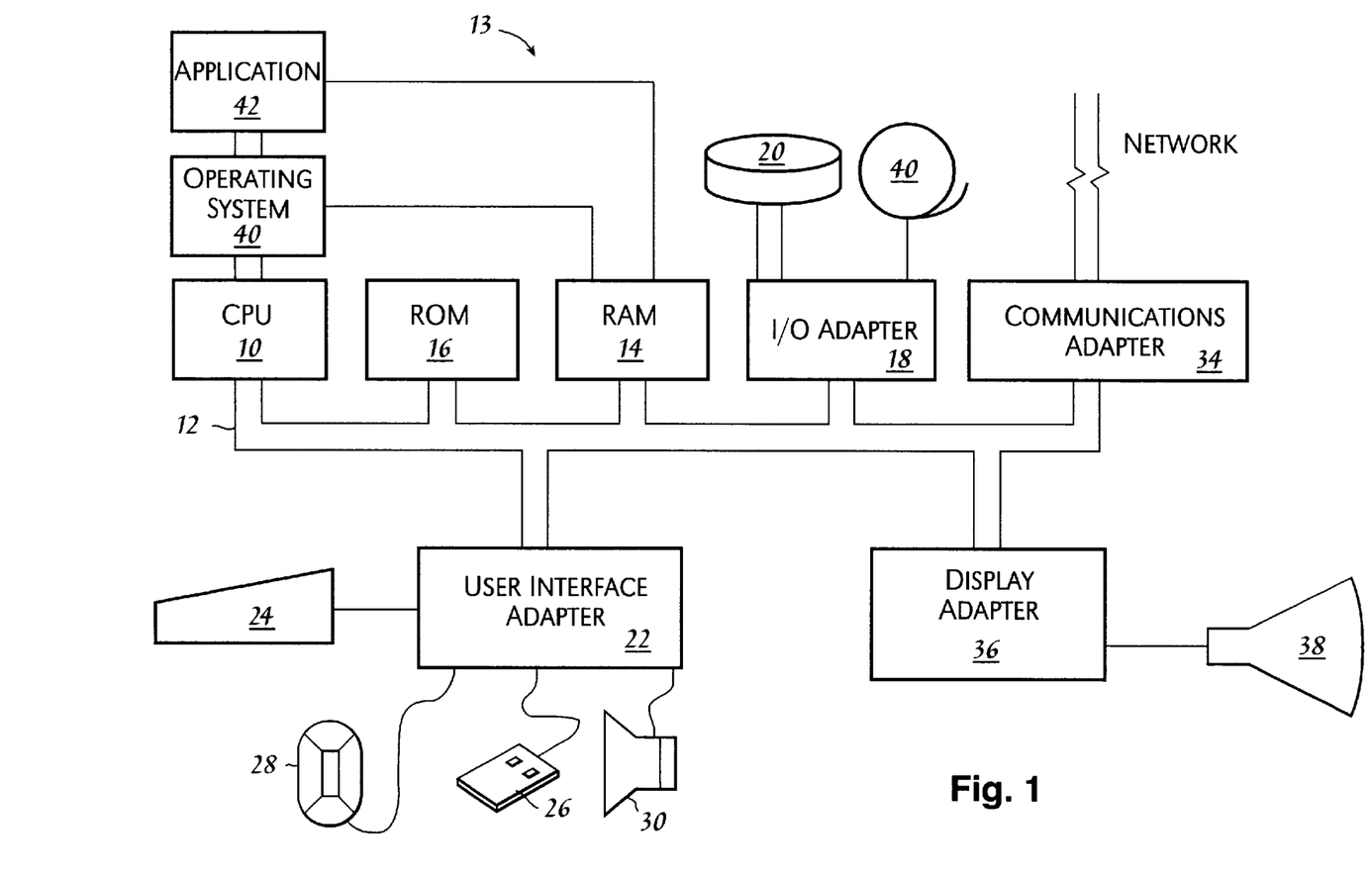
FIG. 1 illustrates a data processing system configured in accordance with the present invention.

FIG. 1—Computer System

FIG. 1 illustrates atypical hardware configuration of data processing system 13 which is representative of a hardware environment for practicing the present invention. Data processing system 13 has a central processing unit (CPU) 10, such as a conventional microprocessor, coupled to various other components by system bus 12. An operating system 40 runs on CPU 10 and provides control and coordinates the function of the various components of FIG. 1. Application 42, e.g., program for estimating the number of internationalization faults in a software program as described in FIG. 2, runs in conjunction with operating system 40 and provides output calls to operating system 40 which implements the various functions to be performed by application 42. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 40 and application 42 are loaded into RAM 14 which is the computer system's main memory. I/O adapter 18 may be a small computer system interface ("SCSI") adapter that communicates with disk units 20, e.g., disk drive, and tape drives 40. It is noted that the program for estimating the number of internationalization faults in a software program as described in FIG. 2 may also reside in disk units 20. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. Event data may be input to data processing system 13 through any of these devices. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
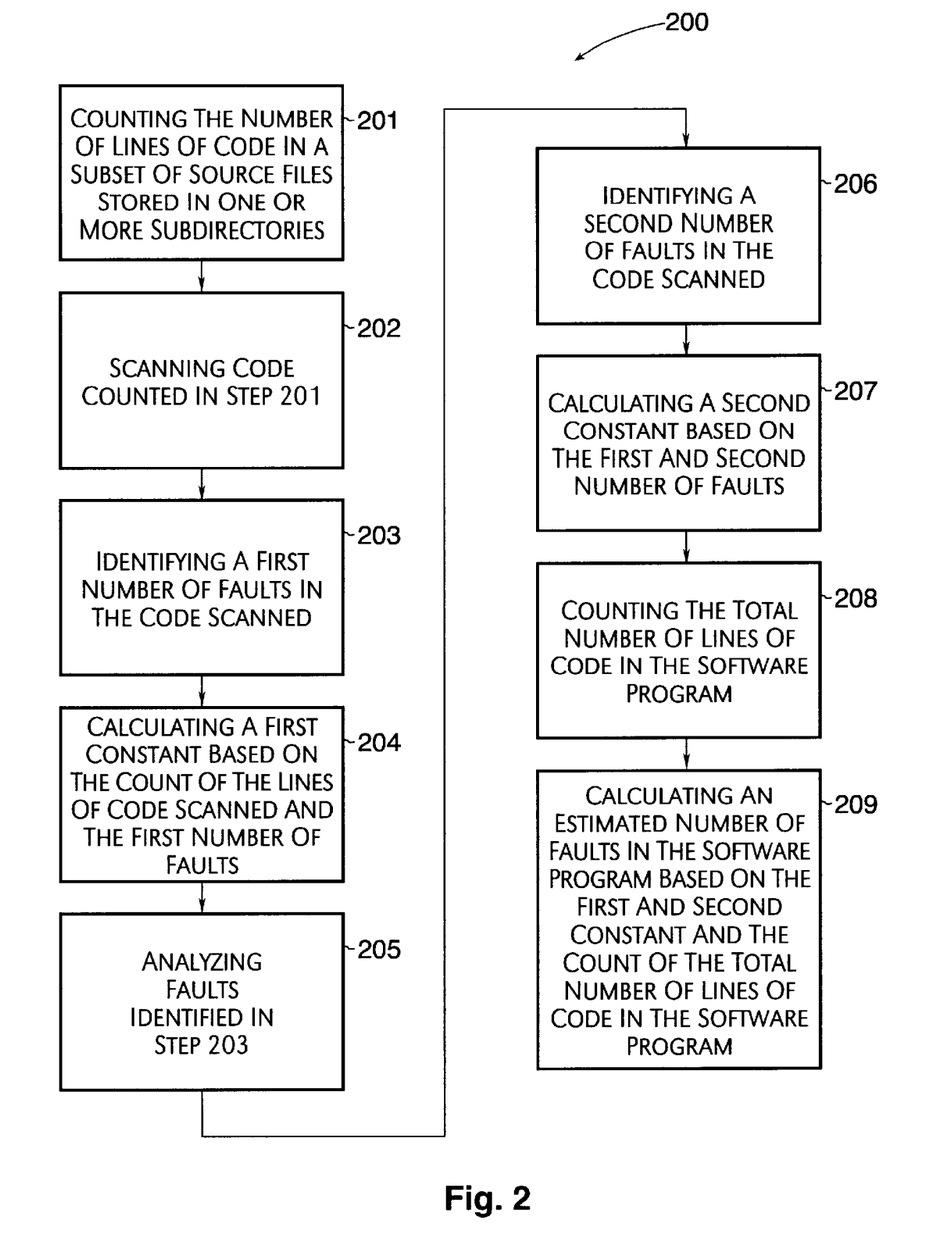
FIG. 2 is a flowchart of a method for estimating the number of internationalization faults in a software program.

FIG. 2—Method for Estimating the Number of Internationalization Faults in a Software Program FIG. 2 illustrates a flowchart of one embodiment of the present invention of a method 200 for estimating the number of internationalization faults, e.g., errors, warnings, in an internationalized software program. As stated in the Background Information section, the total time spent testing and debugging an internationalized software program may vary from program to program. Unfortunately, software developers when asked to test and debug a particular internationalized software program may not be able to estimate the number of internationalization faults, e.g., errors, warnings, in the particular internationalized software program to be debugged thereby being unable to estimate the number of hours to be spent testing and debugging the internationalized software program. Furthermore, a project manager may assign multiple software developers to test and debug a particular internationalized software program. Unfortunately, the project manager may not be able to determine the exact number of software developers to be assigned since the project manager may not be able to estimate the number of internationalization faults, e.g., errors, warnings, in the particular internationalized software program to be debugged thereby being unable to estimate the number of software developers to be assigned to test and debug the particular internationalized software program. It would therefore be desirable to develop a method to estimate the number of internationalization faults, e.g., errors, warnings, in a particular internationalized software program. Method 200 is a method for estimating the number of internationalization faults, e.g., errors, warnings, in a particular internationalized software program.

In step 201, a program may count the number of lines of code of a subset of source files stored in one or more subdirectories where each subdirectory corresponds to a component, i.e. element, of a software program. Source files are files that comprise software code, e.g., Java, C, that may be used to perform one or more functions. These source files may be stored in one or more subdirectories in disk unit 20. Each subdirectory comprises one or more source files, i.e. software code used to perform one or more functions, associated with a particular component, e.g., method to communicate with database, graphical user interface, of a software program as illustrated in FIG. 3.

Figure 3:
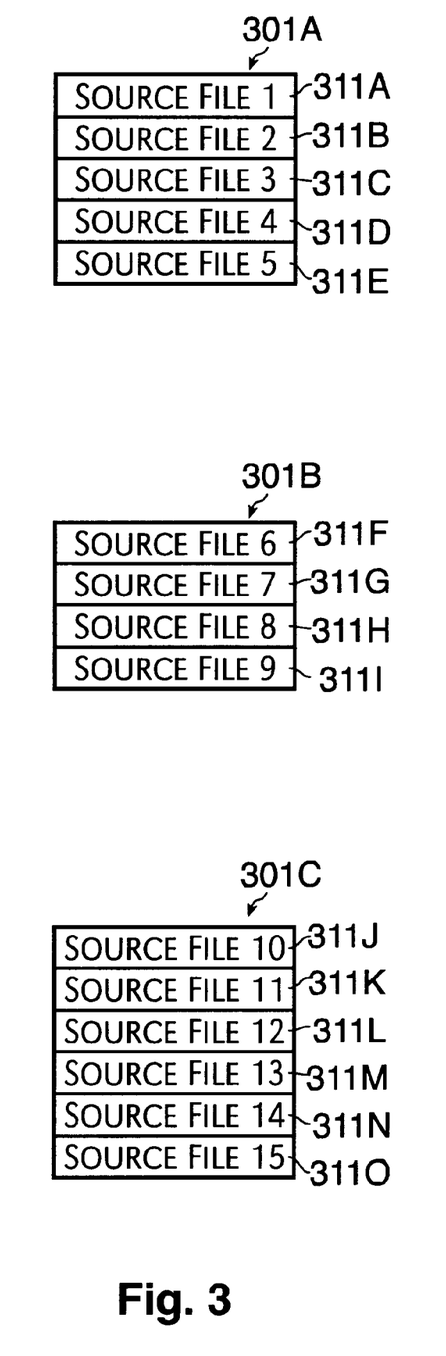
FIG. 3 illustrates a schematic representation of data structures of subdirectories.

FIG. 3 illustrates a schematic representation of data structures 301A–C of subdirectories in disk unit 20. Data structure 301A may comprise a plurality of fields 311A–E storing source files 1–5. Data structure 301B may comprise a plurality of fields 311F–I storing source files 6–9. Data structure 301C may comprise a plurality of fields 311J–O storing source files 10–15. As stated above, each subdirectory, e.g., data structures 301A–C, may correspond to a component, e.g., method to communicate with database, graphical user interface, of a software program. It is noted that disk unit 20 may comprise any number of subdirectories storing any number of source files and that FIG. 3 is illustrative.

As stated above, a program may count the number of lines of code in a subset of source files stored in one or more subdirectories where each subdirectory corresponds to a component, i.e. element, of a software program in step 201. For example, referring to FIG. 3, a program may count the number of lines of code for only two source files in each subdirectory where each subdirectory is associated with a particular component of a software program. For instance, a program may count the lines of code in source files 1 and 2 in data structure 301A, source files 6 and 7 in data structure 301B and source files 10 and 11 in data structure 301C.

It is noted that the program may reside in application 42 or disk unit 20. It is further noted that step 201 maybe performed by a separate tool, e.g., source line counting tool, that may reside in application 42 or disk unit 20.

In step 202, the program may further scan the code counted in step 201 for internationalization errors and warnings. That is, the program may scan the code in a subset of source files stored in one or more subdirectories where each subdirectory corresponds to a component, i.e. element, of a software program.

Internationalization errors may include hard-coded strings which are text strings that are hard-coded in the code, i.e. the text will not vary whether the code is running on a French or English locale. A locale may represent a geographic, cultural or political region. Hence, a hard-coded string may be a text string that appears in English even when the code is running on the French locale. Various scanning programs such as the program of the present invention may simply detect as hard-coded strings all text enclosed within double quotes ("") which are used as string delimiters in Java (as well as other programming languages). However, not all text enclosed within double quotes are hard-coded strings. Hence, a manual analysis may have to be performed, as in step 205 described below, to determine false internationalization errors.

Internationalization warnings may include possible unsafe function calls where the variables of certain functions require a particular type of variable, e.g., ASCII character. Hence, a manual analysis may have to be performed, as in step 205 described below, to determine whether the variable of the function is the appropriate type. For example, in the Java code below if (isalpha(textMsg[0]))

the function isalpha( ) requires a variable that is an ASCII character. A manual analysis may then have to be performed to determined whether the variable of isalpha( ) is an ASCII character or not.

In step 203, the program may further identify the total number of internationalization errors and warnings in the code scanned as illustrated in Table 1 shown below. Table 1 illustrates the number of errors and warnings identified by the program for the code scanned in each component of a particular exemplary software component.

| Component | Errors | Warnings | Errors and Warnings | Lines of Code Scanned |
|---|---|---|---|---|
| fu | 1371 | 130 | 1501 | 12302 |
| ful | 609 | 93 | 702 | 8462 |
| sc | 436 | 38 | 474 | 4663 |
| mcedit | 294 | 31 | 325 | 4924 |
| ras | 705 | 63 | 768 | 5865 |
| jc | 1433 | 138 | 1571 | 20279 |
| ns | 1189 | 172 | 1361 | 17964 |
| common | 292 | 44 | 336 | 4375 |
| fmk | 462 | 116 | 578 | 5882 |
| pic | 429 | 70 | 499 | 3070 |
| mcr | 2315 | 261 | 2576 | 22946 |
| rdb | 2767 | 335 | 3102 | 17123 |
| tc | 1732 | 127 | 1859 | 13352 |
| we | 1004 | 115 | 1119 | 4290 |
| uil | 5577 | 182 | 5759 | 15960 |

As shown above, Table 1 has separate columns for the components, internalization errors identified, internalization warnings identified, the total internalization errors and warnings identified and the total number of lines of code scanned. Each row of Table 1 lists the number of internalization errors identified, the number of internalization warnings identified, the total number of internalization errors and warnings identified and the total number of lines of code scanned for each component of the software program under analysis. As stated above, the program may identify the total number of internalization errors and warnings in the code scanned in step 203. Referring to Table 1, the total number of internalization errors and warnings in the code scanned in step 203 is 22,520 where the number of internationalization errors is 20,605 and the number of warnings is 1,915. It is noted that the program may be configured to count the number of lines of code scanned for each component as shown in Table 1.

In step 204, a factor, $\alpha$, may be calculated by the program. The equation for calculating the factor, $\alpha$, is:

$$\alpha = E/LOC,$$

where E is the total number of internalization errors and warnings identified in step 203. Referring to Table 1, the total number of internalization errors and warnings (E) is equal to 22,520. LOC is the count of the total number of lines of code scanned in step 201. Referring to Table 1, the count of the total number of lines of code scanned is equal to 161,457. Therefore, $\alpha$ equals the value of 0.1395 (22,520/161,457).

In step 205, a manual analysis of the internalization errors and warnings identified in step 203 is performed by one or more software developers to detect false internationalization faults, e.g., errors, warnings. That is, one or more software developers may perform a manual analysis to eliminate internalization errors and warnings that should not have been identified. These internalization errors and warnings are not correct, i.e. these internalization errors and warnings are false.

In step 206, the program may further determine the number of internalization faults, e.g., errors, warnings, that remain after the manual analysis in step 205 by subtracting the number of false internationalization faults, e.g., errors, warnings, identified in step 205 from the total number of internationalization faults, e.g., errors, warnings, identified in step 203 as illustrated in Table 2 shown below.

| Component | False Errors and Warnings | Errors and Warnings Remaining |
| --- | --- | --- |
| fu | 1498 | 3 |
| ful | 670 | 32 |
| sc | 460 | 14 |
| mcedit | 103 | 222 |
| ras | 766 | 2 |
| jc | 1469 | 102 |
| ns | 1211 | 150 |
| common | 276 | 60 |
| fmk | 472 | 106 |
| pic | 482 | 17 |
| mcr | 2103 | 473 |
| rdb | 2649 | 453 |
| tc | 1789 | 70 |
| wc | 1092 | 27 |
| uil | 5753 | 56 |

As shown above, Table 2 has separate columns for the components, false internationalization errors and warnings and the number of internalization errors and warnings remaining. Each row of Table 2 lists the number of false internalization errors and warnings identified and the number of internalization errors and warnings remaining for each component of the software program under analysis. As stated above, the program may further determine the number of internationalization faults, e.g., errors, warnings, that remain after the manual analysis in step 205 by subtracting the number of false internationalization faults, e.g., errors, warnings, identified in step 205 from the total number of internationalization faults, e.g., errors, warnings, identified in step 203. Referring to Table 2, the total number of internalization errors and warnings remaining after the manual analysis in step 205 equals 1,787 (22,520–20,733).

In step 207, a factor, $\beta$, may be calculated by the program. The equation for calculating the factor, $\beta$, is:

$$\beta = EWR/E,$$

where EWR is the total number of internationalization errors and warnings remaining as identified in step 206. Referring to Table 2, the total number of internationalization errors and warnings remaining (EWR) is equal to 1,787. E is the total number of internationalization errors and warnings identified in step 203. Referring to Table 1, the total number of internationalization errors and warnings (E) is equal to 22,520. Therefore, $\beta$ equals the value of 0.0794 (1,787/22,520).

In step 208, the program may further count the total number of lines of code in the entire software program, i.e. the entire code in all the source files in all the subdirectories corresponding to all the components of the software program. In one embodiment, step 208 may be performed by a separate tool, e.g., source line counting tool, that may reside in application 42 or disk unit 20.

In step 209, the program may further calculate an estimate of the number of internationalization faults, e.g., errors, warnings, in the entire code of the software program, i.e. the entire code in all the source files in all the subdirectories corresponding to all the components of the software program, based on the factor calculated in step 204, the factor calculated in step 207 and the total number of lines of code in the entire software program, i.e. the entire code in all the source files in all the subdirectories corresponding to all the components of the software program. The equation for calculating the estimated number, Eest, of internationalization faults, e.g., errors, warnings, in the entire code of the software program is:

$$Eest = \alpha * \beta * LOCtot,$$

where $\alpha$ is the factor calculated in step 204. Referring to step 204, $\alpha$ equaled the value of 0.1395. $\beta$ is the factor calculated in step 207. Referring to step 207, $\beta$ equaled the value of 0.0794. LOCtot is the total number of lines of code in the software program counted in step 208. Therefore, Eest equals the value of 0.0111*LOCtot (0.1395*0.0794*LOCtot).

By estimating the number of internationalization errors and warnings that need to be manually analyzed in the entire software program, the time to spend testing and debugging the software program may be estimated. Furthermore, by estimating the number of internationalization errors and warnings that need to be manually analyzed in the entire software program, the number of software developers to be assigned to test and debug the particular software program may be estimated. The greater the number of internationalization errors and warnings that need to be analyzed the greater the time that needs to be spent testing and debugging the software program as well as the greater the number of software developers that need to be assigned to test and debug the particular software program.

For example, the following formula may be used to estimate the time a software developer may spend testing and debugging the entire software program:

$$Etime = ((Ne*Te*Fs) + (Nw*Tw*Fs))/(60)$$

where Etime is the estimated time a software developer may spend testing and debugging the entire software program measured in hours, Ne is the estimated number of internationalization errors, e.g., hard-coded strings, in the entire code of the software program, Te is the estimated amount of times in minutes, e.g., 15 minutes, that each error requires to be manually analyzed, Nw is the estimated number of internationalization warnings, e.g., unsafe function calls, in the entire code of the software program, Tw is the estimated amount of times in minutes, e.g., 20 minutes, that each warning requires to be manually analyzed, and Fs is the skill level of the developer manually analyzing the internationalization errors and warnings. It is noted that the quantity ((Ne*Te*Fs)+(Nw*Tw*Fs)) is divided by (60) in order to get the units of Etime to be in hours since there are 60 minutes in an hour.

Ne and Nw may be derived from the total number of warnings and errors as identified by the program in the code scanned in step 203. Referring to Table 1, the total number of errors in the code scanned was 20,605 and the total number of warnings in the code scanned was 1,915. Hence, the ratio of the total number of warnings to the total number of errors as identified by the program in the code scanned in step 203 is 0.09294 (1,195/20,605). The ratio of the total number of errors to the total number of warnings as identified by the program in the code scanned in step 203 is 0.90706 (20,605/1,195). The ratios may then be used to determine the estimated number of errors and warnings in the estimated number of internationalization faults, e.g., errors, warnings, in the entire code of the software program. The estimated number of warnings in the entire code of the software program (Nw) may equal the ratio of the total number of warnings to the total number of errors as identified in step 203 (0.09294)*Eest. The estimated number of errors in the entire code of the software program (Nw) may equal the ratio of the total number of errors to the total number of warnings as identified in step 203 (0.90706) *Eest.

As stated above, Fs is the skill level of the developer manually analyzing the internationalization errors and warnings. For example, a skilled developer with experience detecting internationalization errors and warnings may have a skill level of 1. A skilled developer but with no experience detecting internationalization errors and warnings may have a skill level of 1.5. An unskilled developer with no experience detecting internationalization errors and warnings may have a skill level of 2.0. It is noted that there may be further graduations in the skill levels of the software developers and that the above is illustrative.

It is further noted that the above formula used to estimate the time a software developer may spend testing and debugging the entire software program may be expanded by taking into consideration classifications of errors and warnings. For example, the following formula may be used to estimate the time a software developer may spend testing and debugging a entire software program with different types of errors and warnings and the difficulties in analyzing those errors and warnings:

$$Etime=(((Ne_1*Te_1*Fs)+(Ne_2*Te_2*Fs)+\ldots)+((Nw_1*Tw_1*Fs)+(Nw_2Tw_2*Fs)+\ldots))/(60)$$

where $Ne_1$ is the estimated number of a first type of error in the entire code of the software program, $Te_1$ is the estimated amount of times in minutes, e.g., 15 minutes, that each error of the first type requires to be manually analyzed, $Ne_2$ is the estimated number of a second type of error, in the entire code of the software program, $Te_2$ is the estimated amount of times in minutes, e.g., 21 minutes, that each error of the second type requires to be manually analyzed and so forth, $Nw_1$ is the estimated number of internationalization warnings of a first type in the entire code of the software program, $Tw_1$ is the estimated amount of times in minutes, e.g., 16 minutes, that each warning of the first type requires to be manually analyzed, $Nw_2$ is the estimated number of internationalization warnings of a second type in the entire code of the software program, $Tw_2$ is the estimated amount of times in minutes, e.g., 16 minutes, that each warning of the second type requires to be manually analyzed and so forth. It is noted that the above formula may comprise any number of classifications of errors and warnings and that the above formula is illustrative.

It is further noted that the formula used to estimate the time a software developer may spend testing and debugging the entire software program may be expanded by taking into consideration multiple software developers testing and debugging the entire software program. For example, the following formula may be used to estimate the time multiple software developer may spend testing and debugging the entire software program:

$$Etotal=Etime_1+Etime_2+\ldots$$

where $Etime_1$ is the estimated time a first software developer may spend testing and debugging a set of errors and warnings assigned to the first software developer, $Etime_2$ is the estimated time a second software developer may spend testing and debugging a set of errors and warnings assigned to the second software developer and so forth. In calculating the estimated time a particular software developer may spend testing and debugging a set of errors and warnings assigned to the software developer, the formula for calcluating the estimated time may equal:

$$Etime_1=(((Ne_{11}*Te_{11}*Fs_1)+(Ne_{12}*Te_{12}*Fs_1)+\ldots)+((Nw_{11}*Tw_{11}*Fs1)+(Nw_{12}*Tw_{12}*Fs)+\ldots))/(60)$$

where $Ne_{11}$ is the estimated number of a first type of error in the entire code of the software program assigned to a first software developer, $Te_{11}$ is the estimated amount of times in minutes, e.g., 15 minutes, that each error of the first type requires to be manually analyzed by the first software developer, $Ne_{12}$ is the estimated number of a second type of error, in the entire code of the software program assigned to the first software developer, $Te_{12}$ is the estimated amount of times in minutes, e.g., 21 minutes, that each error of the second type requires to be manually analyzed by the first software developer and so forth, $Nw_{11}$ is the estimated number of internationalization warnings of a first type in the entire code of the software program assigned to the first software developer, $Tw_{11}$ is the estimated amount of times in minutes, e.g., 16 minutes, that each warning of the first type requires to be manually analyzed by the first software developer, $Nw_{12}$ is the estimated number of internationalization warnings of a second type in the entire code of the software program assigned to the first software developer, $Tw_{12}$ is the estimated amount of times in minutes, e.g., 16 minutes, that each warning of the second type requires to be manually analyzed by the first software developer and so forth. It is noted that the above formula may be applied to each software developer assigned the task of analyzing the software program and that the above formula is illustrative.

It is noted that steps 201–209 may be combined or executed in any order and that steps 201–209 are illustrative. It is further noted that the program of the present invention may reside in disk unit 20 or application 42. It is further noted that the program of the present invention maybe implemented to estimate internationalization faults, e.g., errors, warnings, that need to be manually analyzed in the entire software program in any type of programming language.

Although the method, computer program product and data processing system of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for estimating the number of internationalization faults in a software program comprising the steps of:

scanning a subset of a total number of lines of code of said software program;

identifying a first number of internationalization faults in said lines of code scanned;

calculating a first factor based on a count of said lines of code scanned and said first number of internationalization faults identified;

identifying a second number of internationalization faults in said lines of code scanned;

calculating a second factor based on said first and said second number of internationalization faults in said lines of code scanned; and calculating an estimated number of internationalization faults for said software program based on said first and said second factor and a count of said total number of lines of code of said software program.

2. The method as recited in claim 1 further comprising the step of:

analyzing said lines of code scanned to detect false internationalization faults.

3. The method as recited in claim 2, wherein said second number of internationalization faults is determined by subtracting a number of said false internationalization faults detected from said first number of internationalization faults.

4. The method as recited in claim 1, wherein said lines of code of said software program are lines of code of source files.

5. The method as recited in claim 4, wherein said source files are stored in one or more subdirectories, wherein each subdirectory is associated with a particular component of said software program.

6. The method as recited in claim 5, wherein said lines of code scanned are the lines of code associated with a subset of said source files stored in said one or more subdirectories.

7. The method as recited in claim 1, wherein said step of calculating said first factor uses the equation:

$$\alpha = E/LOC$$

wherein $\alpha$ is said first factor, wherein E is said first number of internationalization faults in said lines of code scanned, and wherein LOC is a count of said lines of code scanned.

8. The method as recited in claim 7, wherein said step of calculating said second factor uses the equation:

$$\beta = EWR/E$$

wherein $\beta$ is said first factor, wherein EWR is said second number of internationalization faults in said lines of code scanned, and wherein E is said first number of internationalization faults in said lines of code scanned.

9. The method as recited in claim 8, wherein said step of calculating said estimated number of internationalization faults for said software program uses the equation:

$$Eest = \alpha * \beta * LOCtot$$

wherein Eest is said estimated number of internationalization faults for said software program, and wherein LOCtot is said count of said total number of lines of code of said software program.

10. The method as recited in claim 1, wherein said internationalization faults are internationalization errors and warnings.

11. A computer program product adaptable for storing in a computer readable medium and operable for estimating the number of internationalization faults in a software program, comprising:

programming operable for scanning a subset of a total number of lines of code of said software program;

programming operable for identifying a first number of internationalization faults in said lines of code scanned;

programming operable for calculating a first factor based on a count of said lines of code scanned and said first number of internationalization faults identified;

programming operable for identifying a second number of internationalization faults in said lines of code scanned;

programming operable for calculating a second factor based on said first and said second number of internationalization faults in said lines of code scanned; and programming operable for calculating an estimated number of internationalization faults for said software program based on said first and said second factor and a count of said total number of lines of code of said software program.

12. The computer program product as recited in claim 11, wherein a user analyzes said lines of code scanned to detect false internationalization faults.

13. The computer program product as recited in claim 12, wherein said second number of internationalization faults is determined by subtracting a number of said false internationalization faults detected from said first number of internationalization faults.

14. The computer program product as recited in claim 11, wherein said lines of code of said software program are lines of code of source files.

15. The computer program product as recited in claim 14, wherein said source files are stored in one or more subdirectories, wherein each subdirectory is associated with a particular component of said software program.

16. The computer program product as recited in claim 15, wherein said lines of code scanned are the lines of code associated with a subset of said source files stored in said one or more subdirectories.

17. The computer program product as recited in claim 11, wherein said calculating said first factor uses the equation:

$$\alpha = E/LOC$$

wherein $\alpha$ is said first factor, wherein E is said first number of internationalization faults in said lines of code scanned, and wherein LOC is a count of said lines of code scanned.

18. The computer program product as recited in claim 17, wherein said calculating said second factor uses the equation:

$$\beta = EWR/E$$

wherein $\beta$ is said first factor, wherein EWR is said second number of internationalization faults in said lines of code scanned, and wherein E is said first number of internationalization faults in said lines of code scanned.

19. The computer program product as recited in claim 18, wherein said calculating said estimated number of internationalization faults for said software program uses the equation:

$$Eest = \alpha * \beta * LOCtot$$

wherein Eest is said estimated number of internationalization faults for said software program, and wherein LOCtot is said count of said total number of lines of code of said software program.

20. The computer program product as recited in claim 11, wherein said internationalization faults are internationalization errors and warnings.

21. A data processing system, comprising:

a processor;

a memory unit for storing a computer program operable for estimating the number of internationalization faults in a software program;

an input mechanism;

an output mechanism;

a bus system for coupling the processor to the memory unit, input mechanism, and output mechanism, wherein the computer program is operable for performing the following programming steps:

scanning a subset of a total number of lines of code of said software program;

identifying a first number of internationalization faults in said lines of code scanned;

calculating a first factor based on a count of said lines of code scanned and said first number of internationalization faults identified;

identifying a second number of internationalization faults in said lines of code scanned;

calculating a second factor based on said first and said second number of internationalization faults in said lines of code scanned; and calculating an estimated number of internationalization faults for said software program based on said first and said second factor and a count of said total number of lines of code of said software program.

22. The data processing system as recited in claim 21, wherein a user analyzes said lines of code scanned to detect false internationalization faults.

23. The data processing system as recited in claim 22, wherein said second number of internationalization faults is determined by subtracting a number of said false internationalization faults detected from said first number of internationalization faults.

24. The data processing system as recited in claim 21, wherein said lines of code of said software program are lines of code of source files.

25. The data processing system as recited in claim 24, wherein said source files are stored in one or more subdirectories, wherein each subdirectory is associated with a particular component of said software program.

26. The data processing system as recited in claim 25, wherein said lines of code scanned are the lines of code associated with a subset of said source files stored in said one or more subdirectories.

27. The data processing system as recited in claim 21, wherein said programming step of calculating said first factor uses the equation:

$$\alpha = E/LOC$$

wherein $\alpha$ is said first factor, wherein E is said first number of internationalization faults in said lines of code scanned, and wherein LOC is a count of said lines of code scanned.

28. The data processing system as recited in claim 27, wherein said programming step of calculating said second factor uses the equation:

$$\beta = EWR/E$$

wherein $\beta$ is said first factor, wherein EWR is said second number of internationalization faults in said lines of code scanned, and wherein E is said first number of internationalization faults in said lines of code scanned.

29. The data processing system as recited in claim 28, wherein said programming step of calculating said estimated number of internationalization faults for said software program uses the equation:

$$Eest = \alpha * \beta * LOCtot$$

wherein Eest is the estimated number of internationalization faults for said software program, and wherein LOCtot is said count of said total number of lines of code of said software program.

30. The data processing system as recited in claim 21, wherein said internationalization faults are internationalization errors and warnings.

\* \* \* \* \*